(12) United States Patent
Ghaly et al.

(10) Patent No.: US 6,930,865 B2
(45) Date of Patent: Aug. 16, 2005

(54) MAGNETORESISTIVE READ SENSOR WITH SHORT PERMANENT MAGNETS

(75) Inventors: Mai Abdelhamid Ghaly, Bloomington, MN (US); David James Larson, Northfield, MN (US); Paul Edward Anderson, Eden Prairie, MN (US); Kristin J. Duxstad, Eden Prairie, MN (US); Brenda Anne Everitt, Minneapolis, MN (US); Patrick John Moran, Bloomington, MN (US); Steven Barclay Slade, Fort Collins, CO (US); Eric Walter Singleton, Maple Plain, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 168 days.

(21) Appl. No.: 10/348,386

(22) Filed: Jan. 21, 2003

(65) Prior Publication Data

US 2003/0214765 A1 Nov. 20, 2003

Related U.S. Application Data

(60) Provisional application No. 60/380,685, filed on May 14, 2002.

(51) Int. Cl.$^7$ ................................................. G11B 5/33
(52) U.S. Cl. ................................................. 360/324.12
(58) Field of Search ....................... 360/324.12, 324, 360/324.1, 324.11

(56) References Cited

U.S. PATENT DOCUMENTS

| | | | |
|---|---|---|---|
| 5,708,358 A | 1/1998 | Ravipati ...................... 324/252 |
| 5,736,060 A | 4/1998 | George et al. ................. 216/22 |
| 5,737,155 A | 4/1998 | George et al. ............... 360/113 |
| 5,818,685 A | 10/1998 | Thayamballit et al. ....... 360/113 |
| 5,883,763 A | * 3/1999 | Yuan et al. ................... 360/324 |
| 5,928,715 A | 7/1999 | Ravipati et al. ............. 427/130 |
| 5,946,168 A | 8/1999 | Hashimoto et al. .......... 360/113 |
| 6,111,722 A | * 8/2000 | Fukuzawa et al. ..... 360/324.12 |
| 6,118,624 A | 9/2000 | Fukuzawa et al. .......... 360/113 |
| 6,134,091 A | 10/2000 | Toki et al. .............. 360/324.11 |
| 6,144,534 A | 11/2000 | Xue et al. ............... 360/327.31 |
| 6,178,071 B1 | 1/2001 | Hasegawa et al. ..... 360/324.11 |
| 6,191,926 B1 | 2/2001 | Everitt et al. .......... 360/324.11 |
| 6,350,487 B1 | 2/2002 | Hasegawa et al. .......... 427/128 |
| 6,351,357 B1 | 2/2002 | Xue et al. ............... 360/327.31 |
| 6,385,018 B1 | 5/2002 | Mukoyama ............. 360/324.12 |
| 2002/0067579 A1 | 6/2002 | Sato ............................ 360/320 |
| 2002/0135956 A1 | * 9/2002 | Hasegawa et al. ..... 360/324.12 |

* cited by examiner

Primary Examiner—George J. Letscher
(74) Attorney, Agent, or Firm—Kinney & Lange, P.A.

(57) ABSTRACT

A transducing head has a magnetoresistive sensor, a first bias element, and a second bias element. The magnetoresistive sensor is positioned between the first and second bias elements, and has a sensor width. The first bias element has a first length and the second bias element has a second length. The direction of the first and second lengths are substantially similar to the direction of the sensor width. The first and second lengths in the range of about one-tenth to about twenty times the sensor width.

17 Claims, 8 Drawing Sheets

MAGNETORESISTIVE READ SENSOR WITH SHORT PERMANENT MAGNETS

CROSS-REFERENCE TO RELATED APPLICATION(S)

This application claims priority from provisional U.S. patent application Ser. No. 60/380,685 of Mai Abdelhamid Ghaly, Steven Barclay Slade, David James Larson, Paul Edward Anderson, Eric Walter Singleton, and Patrick John Moran, filed on May 14, 2002 and entitled, "Hard Bias Stabilization by Short Permanent Magnets."

BACKGROUND OF THE INVENTION

The present invention relates generally to the field of magnetic data storage and retrieval systems. More particularly, the present invention relates to a transducing head having a magnetoresistive sensor stabilized by short permanent magnet bias elements to increase read sensitivity of the sensor.

A transducing head of a magnetic data storage and retrieval system typically includes a magnetoresistive (MR) reader portion for retrieving magnetic data stored on a magnetic media. The reader is typically formed of several layers which include an MR sensor positioned between two gap layers, which are in turn positioned between two shield layers. The MR sensor may be any one of a plurality of MR-type sensors, including, but not limited to, AMR, GMR, TGMR, spin valve and spin tunneling sensors.

When the transducing head is placed near a magnetic medium, a resistance of the MR sensor fluctuates in response to a magnetic field emanating from written transitions in the magnetic medium. By providing a sense current through the MR sensor, the resistance of the sensor can be measured and used by external circuitry to decipher the information stored on the magnetic medium.

To operate the MR sensor properly, the sensor must be stabilized against the formation of edge domains because domain wall motion results in electrical noise that makes data recovery difficult. A common way to achieve stabilization is with a permanent magnet abutted junction design in which permanent magnet bias elements directly abut opposite sides of the MR sensor. Permanent magnets have a high coercive field (i.e., are hard magnets). The magnetostatic field from the permanent magnets stabilizes the MR sensor, prevents edge domain formation, and provides proper bias.

In recent years, MR sensor widths have been decreased to accommodate ever-increasing areal densities of magnetic media. But, with a decrease in MR sensor widths, it has been important to maintain constant MR sensor output by increasing MR sensor sensitivity. In prior art designs, this goal has been accomplished by several methods, including decreasing a thickness of a sensing layer of the MR sensor and/or reducing a thickness of the permanent magnet bias elements and/or recessing the permanent magnet bias elements a distance from the MR sensor, a method introduced by U.S. patent application Ser. No. 10/027,051, hereby incorporated by reference. MR sensor sensitivity has also been accomplished by an increase in MR ratio.

In the case of reducing the permanent magnet thickness, there have been process-control issues with creating ever-thinner permanent magnet layers. Namely, it is difficult with thinner permanent magnets to achieve consistent thicknesses of the layers, particularly across a wafer upon which tens of thousands of MR sensors are built. That is, the permanent magnets formed near the center of the wafer may be thicker than the permanent magnets formed near the edge of the wafer. Also, this may result in the two permanent magnets associated with one MR sensor having unequal thicknesses. As the thickness of the permanent magnet bias elements is decreased, this asymmetry in thickness becomes a substantially large percentage of the total MR sensor thickness. For instance, an asymmetry of 50 Angstroms would result in a 50% difference in thickness across the wafer for a targeted 100 Angstroms thick permanent magnet, whereas it would be only a 10% difference for a targeted 500 Angstroms thick permanent magnet.

Thus, there is a need for a MR sensor design having increased sensitivity without requiring a decrease in thickness of the abutted permanent magnets.

BRIEF SUMMARY OF THE INVENTION

The present invention is a transducing head having a magnetoresistive sensor, a first bias element, and a second bias element. The magnetoresistive sensor is positioned between the first and second bias elements, and has a sensor width. The first bias element has a first length and the second bias element has a second length. The direction of the first and second lengths are substantially similar to the direction of the sensor width. The first and second lengths are in the range of about one-tenth to about twenty times the sensor width.

DETAILED DESCRIPTION

Figure 1A:
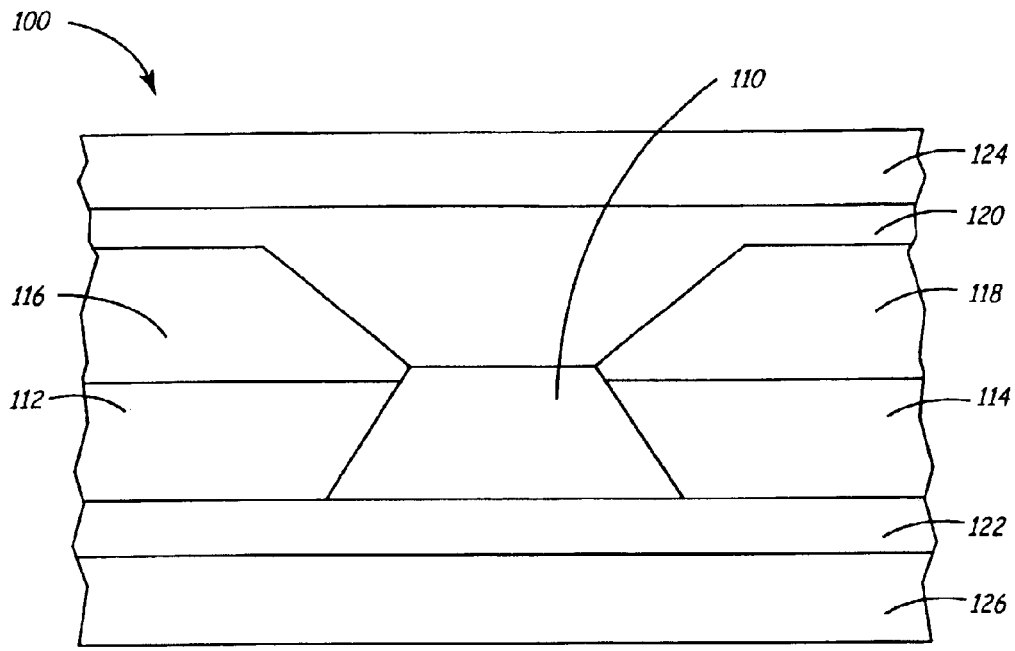
FIG. 1A is a cross-sectional view of a prior art current-in-plane transducing head.

FIG. 1A is a cross-sectional view of prior art current-in-plane (CIP) transducing head 100. Transducing head 100 comprises magnetoresistive (MR) sensor 110, permanent magnet (PM) bias elements 112 and 114, contacts 116 and 118, gap layers 120 and 122, and shields 124 and 126.

MR sensor 110 is a multilayer device operable to sense magnetic flux from a magnetic media. MR sensor 110 may be any one of a plurality of MR-type sensors, including, but not limited to, AMR, GMR, and spin valve. At least one layer of MR sensor 110 is a sensing layer, such as a free layer of a GMR spin valve sensor, that requires longitudinal biasing.

PM bias elements 112 and 114 abut opposite sides of MR sensor 110. PM bias elements 112 and 114 provide longitudinal biasing for the sensing layer of MR sensor 110. PM bias elements 112 and 114 are each generally formed of a hard magnetic material, such as, but not limited to, CoCrPt, CoCr, CoCrTa, CoCrTaPt, CoPt, or CoNiCr. PM bias elements 112 and 114 are commonly formed with a thickness in a range of about 100 Angstroms to about 1000 Angstroms. PM bias elements 112 and 114 are effectively infinite in length, having a length thousands of times greater than a width of MR sensor 110.

Contact 116 is formed on PM bias element 112. Similarly, contact 118 is formed on PM bias element 114. Contacts 116 and 118 abut opposite sides of MR sensor 110. Contacts 116 and 118 function to provide a sense current to MR sensor 110 in a direction substantially parallel to planes of layers (not shown) of MR sensor 110. As is generally known in the industry, the sense current is passed through MR sensor 110 to detect changes in the resistivity of MR sensor 110, which is indicative of the data stored on the magnetic medium being read. Contacts 116 and 118 are typically formed of conductive materials, such as, but not limited to, tantalum, rhodium, titanium, tungsten, chromium, copper, gold or silver. Contacts 116 and 118 are commonly formed with a thickness in a range of about 50 Angstroms to about 1000 Angstroms.

Gap layer 120 is formed adjacent MR sensor 110 and contacts 116 and 118. Gap layer 122 is formed adjacent MR sensor 110 and adjacent PM bias elements 112 and 114. Gap layers 120 and 122 abut opposite sides of MR sensor 110. Gap layers 120 and 122 function to magnetically insulate MR sensor 110 from shields 124 and 126. Gap layers 120 and 122 are formed of nonmagnetic material, and are commonly formed with a thickness in a range of about 50 Angstroms to about 200 Angstroms.

Shield 124 is formed on gap layer 120 opposite MR sensor 110 and contacts 116 and 118. Shield 126 is formed on gap layer 122 opposite MR sensor 110 and PM bias elements 112 and 114. Shields 124 and 126 are formed on opposite sides of MR sensor 110. MR sensor 110 reads only information stored directly beneath it on a specific track of the magnetic medium because shields 124 and 126 function to absorb any stray magnetic fields emanating from adjacent tracks and transitions.

For MR sensor 110 to operate properly, its sensing layer must be stabilized against the formation of edge domains since domain wall motion results in electrical noise that makes data recovery impossible. FIG. 1A illustrates a common approach to achieving this stabilization; that is, with an abutted permanent magnet design in which PM bias elements 112 and 114 are arranged on opposite sides of MR sensor 110. The magnetostatic field from PM bias elements 112 and 114 stabilizes, prevents edge domain formation and provides proper bias for the sensing layer of MR sensor 110.

Figure 1B:
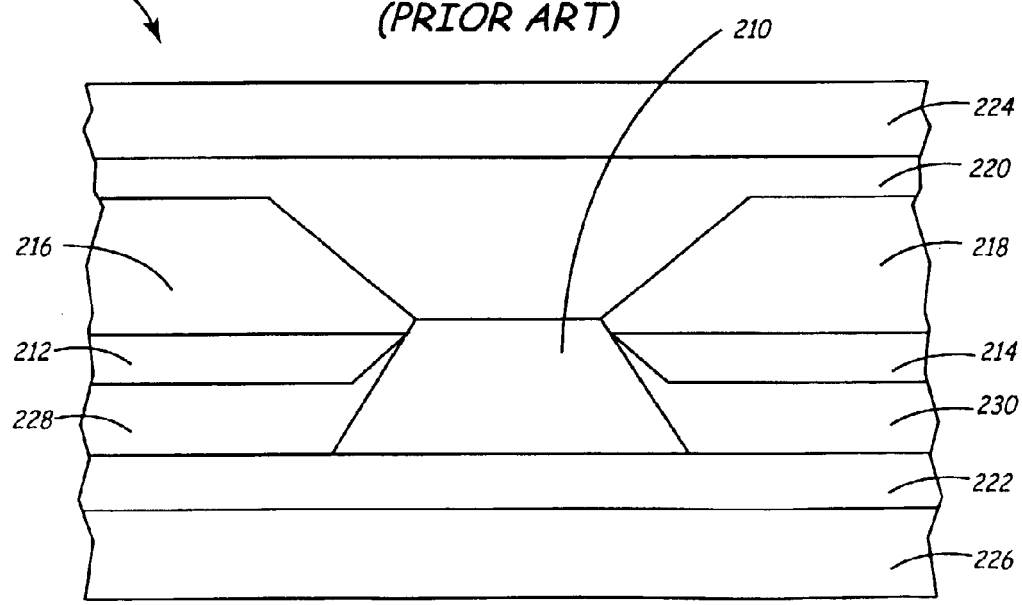
FIG. 1B is a cross-sectional view of a prior art current-in-plane transducing head.

FIG. 1B is a cross-sectional view of prior art CIP transducing head 200. For ease of identification, elements here similar to those in FIG. 1A are like-numbered in the last two digits, for example CIP transducing head 100 and CIP transducing head 200. Transducing head 200 comprises MR sensor 210, PM bias elements 212 and 214, contacts 216 and 218, gap layers 220 and 222, shields 224 and 226, and pedestals 228 and 230. Transducing head 200 differs from transducing head 100 only in that transducing head 200 includes pedestals 228 and 230.

Pedestals 228 and 230 are formed on gap layer 222 and abut opposite sides of MR sensor 210. In a method introduced by U.S. patent application Ser. No. 10/027,051, incorporated by reference earlier in this document, pedestals 228 and 230 are each formed of two portions: a first portion that extends outward from MR sensor 210 and a second portion that extends upward from the first portion adjacent MR sensor 210. PM bias element 212 is formed on the first portion of pedestal 228, with the second portion of pedestal 228 separating PM bias element 212 from MR sensor 210. Similarly, PM bias element 214 is formed on the first portion of pedestal 230, with the second portion of pedestal 230 separating PM bias element 214 from MR sensor 210. Alternatively, PM bias elements 212 and 214 may directly abut MR sensor 210.

Pedestals 228 and 230 function to elevate PM bias elements 212 and 214 to a desirable height. Pedestals 228 and 230 are typically formed of conductive materials, such as, but not limited to, chromium, gold, rhodium, silver, tantalum, titanium or tungsten. Pedestals 228 and 230 are commonly formed with a thickness in the range of about 100 Angstroms to about 500 Angstroms.

FIG. 1B illustrates another common approach to stabilizing the sensing layer of MR sensor 210 against the formation of edge domains; that is, with an elevated permanent magnet design in which PM bias elements 212 and 214 are arranged on respective pedestals 228 and 230 on opposite sides of MR sensor 210. The magnetostatic field from PM bias elements 212 and 214 stabilizes, prevents edge domain formation and provides proper bias for the sensing layer of MR sensor 210.

Figure 1C:
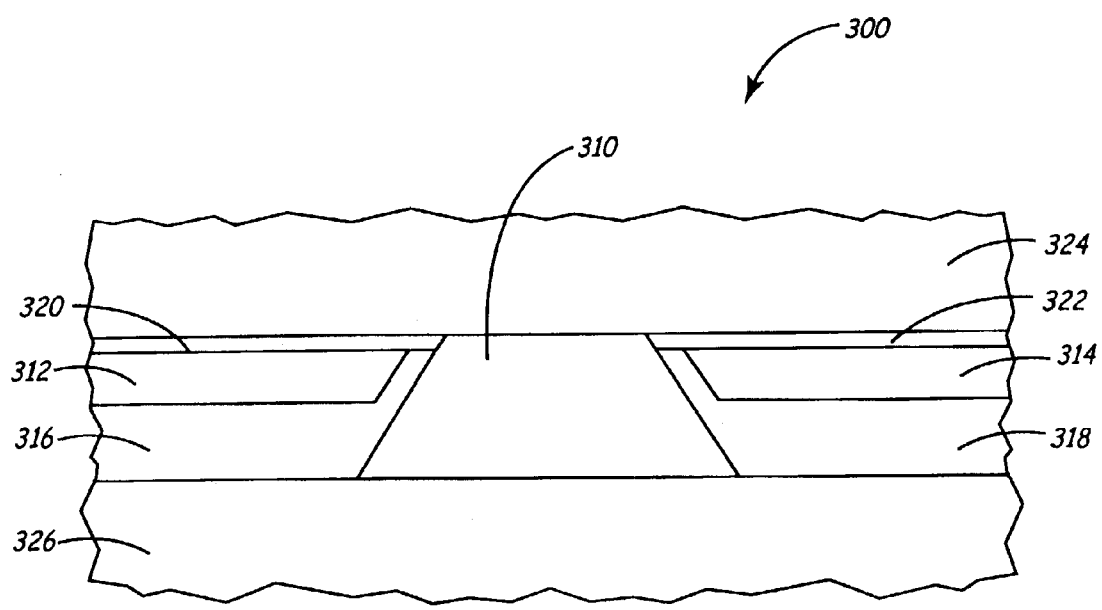
FIG. 1C is a cross-sectional view of a prior art current-perpendicular-to-plane transducing head.

FIG. 1C is a cross-sectional view of prior art current-perpendicular-to-plane (CPP) transducing head 300. For ease of identification, elements here similar to those in FIG. 1A are like-numbered in the last two digits, for example CIP transducing head 100 and CPP transducing head 300. Transducing head 300 comprises tunneling giant magnetoresistive (TGMR) sensor 310, PM bias elements 312 and 314, gap layers 316, 318, 320, and 322, and shields 324 and 326. CPP transducing head 300 differs from CIP transducing heads 100 and 200 in that the sense current to TGMR sensor 310 is provided in a direction substantially perpendicular to the planes of layers (not shown) of TGMR sensor 310, rather than in a direction substantially parallel.

TGMR sensor 310 is a multilayer device operable to sense magnetic flux from a magnetic media. At least one layer of TGMR sensor 310 is a sensing layer that requires longitudinal biasing.

PM bias elements 312 and 314 are formed on opposite sides of TGMR sensor 310. PM bias elements 312 and 314 are recessed from TGMR sensor 310 a distance in the range of about 20 Angstroms to about 300 Angstroms. PM bias elements 312 and 314 provide longitudinal biasing for the sensing layer of MR sensor 310. PM bias elements 312 and 314 are each generally formed of a hard magnetic material, such as, but not limited to, CoCrPt, CoCr, CoCrTa, CoCrTaPt, CoPt, or CoNiCr. PM bias elements 312 and 314 are commonly formed with a thickness in a range of about 100 Angstroms to about 1000 Angstroms.

Gap layer 316 is formed adjacent TGMR sensor 310 between PM bias element 312 and shield 326. Gap layer 318 is formed adjacent TGMR sensor 310 between PM bias element 314 and shield 326. Gap layers 316 and 318 abut opposite sides of TGMR sensor 310. Gap layer 320 is formed adjacent TGMR sensor 310 between PM bias element 312 and shield 324. Gap layer 322 is formed adjacent TGMR sensor 310 between PM bias element 314 and shield 324. Gap layers 320 and 322 abut opposite sides of TGMR sensor 310.

Gap layers 316, 318, 320, and 322 function to magnetically insulate TGMR sensor 310 from shields 324 and 326. Gap layers 316, 318, 320, and 322 also function to minimize shunting of sense current from MR sensor 310 to PM bias elements 312 and 314. Gap layers 316, 318, 320, and 322 are formed of nonmagnetic material, and are commonly formed with a thickness in a range of about 50 Angstroms to about 200 Angstroms.

Shield 324 is formed adjacent TGMR sensor 310 and gap layers 320 and 322. Shield 326 is formed adjacent TGMR sensor 310 and gap layers 316 and 318. Shields 324 and 326 are formed on opposite sides of MR sensor 310. TGMR sensor 310 reads only information stored directly beneath it on a specific track of a magnetic medium because shields 324 and 326 function to absorb any stray magnetic fields emanating from adjacent tracks and transitions. In addition, shields 324 and 326 function to provide a sense current to TGMR sensor 310 in a direction substantially perpendicular to planes of layers (not shown) of TGMR sensor 310. As discussed earlier, the sense current is passed through MR sensor 310 to detect changes in the resistivity of MR sensor, which is indicative of the data stored on the magnetic medium being read. Shields 324 and 326 preferably are composed of a soft magnetic material, such as, but not limited to, an NiFe alloy. Shields 324 and 326 are commonly formed with a thickness in a range of about one tenth microns to about ten microns.

FIG. 1C illustrates a common approach to achieving stabilization of TGMR sensor 310 sensor layer against the formation of edge domains; that is, with an abutted permanent magnet design in which PM bias elements 312 and 314 are arranged on opposite sides of TGMR sensor 310. The magnetostatic field from PM bias elements 312 and 314 stabilizes, prevents edge domain formation and provides proper bias for the sensing layer of TGMR sensor 310.

Figure 2:
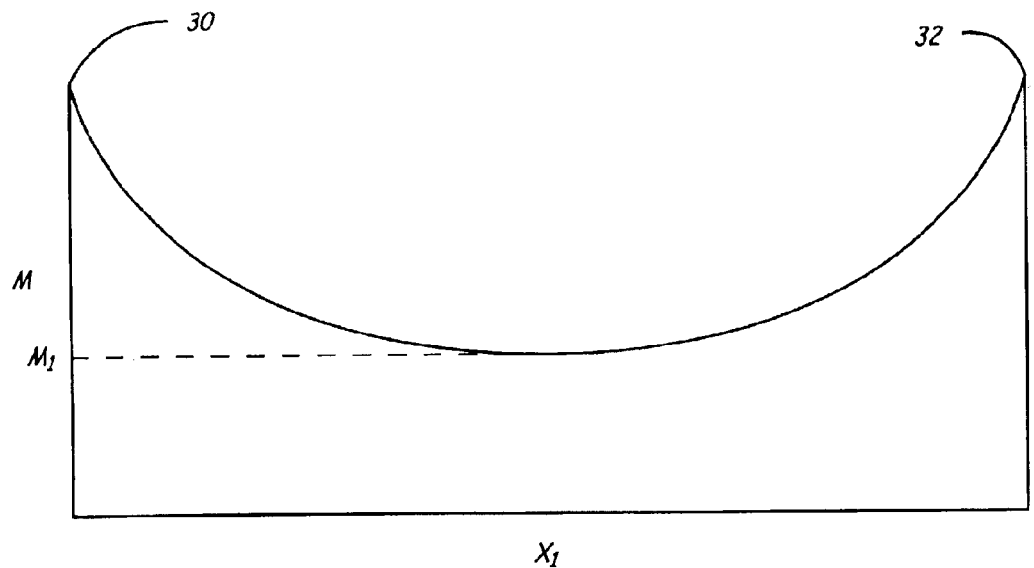
FIG. 2 is a graph relating the strength of a magnetic field exerted by a pair of permanent magnet bias elements on a magnetoresistive sensor along the width $x_1$ of the magnetoresistive sensor.

FIG. 2 is a graph relating the strength of a magnetic field M exerted by a pair of PM bias elements on an MR sensor along a width $x_1$ of the MR sensor. As is evident in FIG. 2, the magnetic field exerted on the MR sensor is greatest at points 30 and 32, which represent the portions of the MR sensor closest to the PM bias elements. In a central active region of the MR sensor, the strength of the magnetic field exerted by the PM bias elements drops to a desirable level $M_1$. As MR sensor width decreases, however, the magnetic field will remain stronger in the central active region.

Figure 3:
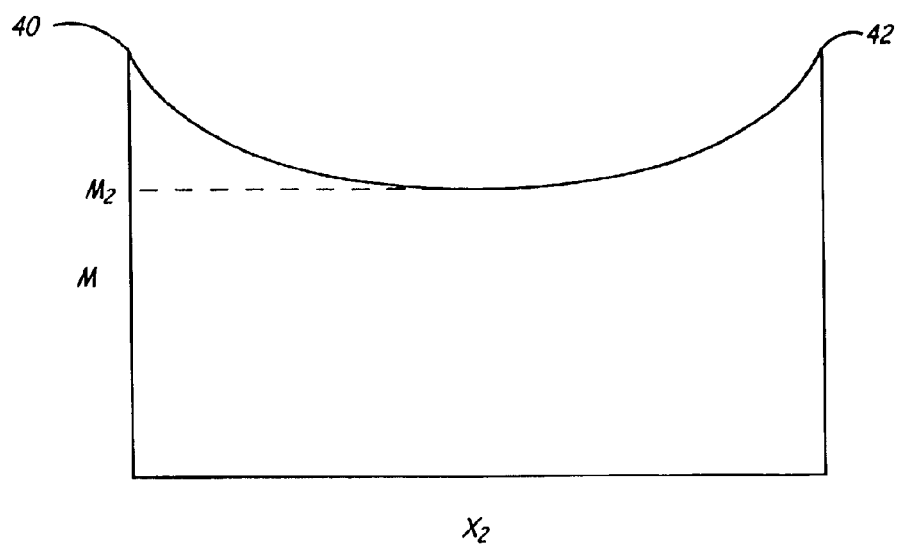
FIG. 3 is a graph relating a magnetic field exerted on a magnetoresistive sensor by a pair of permanent magnet bias elements along a magnetoresistive sensor having a sensor width $x_2$, where $x_2 < x_1$.

FIG. 3 is a graph relating a magnetic field M exerted on a MR sensor by a pair of PM bias elements along a narrower MR sensor having a sensor width $x_2$, where $x_2<x_1$. As is evident in FIG. 3, the magnetic field exerted on the MR sensor is greatest at points 40 and 42, which represent the portions of the MR sensor closest to the PM bias elements. In a central active region of the MR sensor, the strength of the magnetic field exerted by the PM bias elements drops only to a level $M_2$, which is greater than desirable level $M_1$. FIG. 3 shows that as the MR sensor width decreases, the average magnetic field exerted over the MR sensor is higher, which may result in overpinning of the sensor and decreased signal sensitivity.

As shown in FIG. 2 and FIG. 3, with ever-decreasing read sensor widths, there is a need to decrease a strength of the biasing field exerted on a MR sensor by its abutted PM bias elements to thereby increase a sensitivity of MR sensor. One prior art way to increase sensitivity of the MR sensor is to decrease a thickness of the PM bias elements. However, as detailed in the background section above, several process-control issues exist for this prior art solution. U.S. patent application Ser. No. 10/027,051 introduces a second way of increasing sensitivity of an MR sensor by recessing the PM bias elements a distance from the MR sensor.

The present invention introduces another method of reducing the strength of the biasing field exerted on a MR sensor by its abutted PM bias elements. Specifically, the present invention recognizes that a strength of the biasing field exerted on the MR sensor by the PM bias elements can be reduced by shortening a length of the PM bias elements along the air bearing surface from an effectively infinite length to a finite length, rather than decreasing the thickness of PM bias elements. Thus, the present invention is a transducing head having short PM bias elements.

Figure 4:
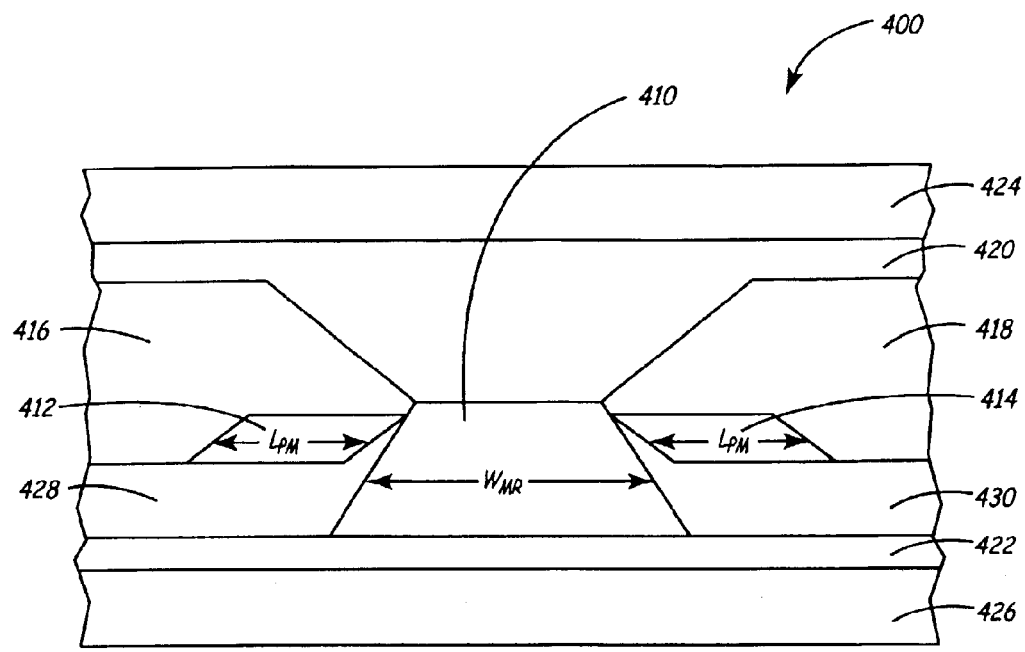
FIG. 4 is a cross-sectional view of a first embodiment of a current-in-plane transducing head in accord with the present invention.

FIG. 4 is a cross-sectional view of CIP transducing head 400 in accord with the present invention. Transducing head 400 comprises MR sensor 410, PM bias elements 412 and 414, contacts 416 and 418, gap layers 420 and 422, shields 424 and 426, and pedestals 428 and 430. MR sensor 410 is a multilayer device operable to sense magnetic flux from a magnetic media. MR sensor 410 may be any one of a plurality of MR-type sensors, including, but not limited to, AMR, GMR, and spin valve. At least one layer of MR sensor 410 is a sensing layer, such as a free layer of a GMR spin valve sensor, that requires longitudinal biasing. MR sensor 410 has a sensor width $W_{MR}$.

Pedestals 428 and 430 abut opposite sides of MR sensor 410. Pedestals 428 and 430 are each formed of two portions: a first portion that extends outward from MR sensor 410 and a second portion that extends upward from the first portion adjacent MR sensor 410. PM bias element 412 is formed on the first portion of pedestal 428, with the second portion of pedestal 428 separating PM bias element 412 from MR sensor 410. Similarly, PM bias element 414 is formed on the first portion of pedestal 430, with the second portion of pedestal 430 separating PM bias element 414 from MR sensor 410. In an alternate embodiment, PM bias elements 412 and 414 may directly abut MR sensor 410. Contact 416 is formed on PM bias element 412 opposite pedestal 428. Similarly, contact 418 is formed on PM bias element 414 opposite pedestal 430. Contacts 416 and 418 abut opposite sides of MR sensor 410.

PM bias elements 412 and 414 provide longitudinal biasing for the sensing layer of MR sensor 410. PM bias elements 412 and 414 are each generally formed of a hard magnetic material, such as, but not limited to CoCrPt, CoCr, CoCrTa, CoCrTaPt, CoPt, or CoNiCr. PM bias elements 412 and 414 are preferably formed with a thickness in a range of about 100 Angstroms to about 1000 Angstroms. PM bias elements 412 and 414 are finite in length $L_{PM}$ measured along MR sensor width $W_{MR}$. PM bias element length $L_{PM}$ is preferably about one-quarter to about five times MR sensor width $W_{MR}$. The finite length $L_{PM}$ of PM bias elements 412 and 414 allows increased sensitivity of MR sensor 410, by decreasing the strength of the magnetic field PM bias elements 412 and 414 exert on MR sensor 410. The present invention increases sensitivity of MR sensor 410 without decreasing the thickness of PM bias elements 412 and 414 as it was done in prior art designs. Thus, the processing concerns with the ever-thinning PM bias elements are no longer a problem.

Contacts 416 and 418 function to provide a sense current to MR sensor 410 in a direction substantially parallel to planes of layers (not shown) of MR sensor 410. The sense current is passed through MR sensor 410 to detect changes in the resistivity of MR sensor 410, which is indicative of the data stored on the magnetic medium being read. Contacts 416 and 418 are typically formed of conductive materials, such as, but not limited to, tantalum, rhodium, titanium, tungsten, chromium, copper, gold or silver. Contacts 416 and 418 are commonly formed with a thickness in a range of about 50 Angstroms to about 1000 Angstroms.

Pedestals 428 and 430 function to elevate PM bias elements 412 and 414 to a desirable height. Pedestals 428 and 430 are typically formed of conductive materials, such as, but not limited to, gold, rhodium, silver, tantalum, titanium, chromium or tungsten. Pedestals 428 and 430 are commonly formed with a thickness in the range of about 100 Angstroms to about 500 Angstroms.

Gap layer 420 is formed adjacent MR sensor 410 and adjacent contacts 416 and 418. Gap layer 422 is formed adjacent MR sensor 410 and adjacent PM bias elements 412 and 414. Gap layers 420 and 422 abut opposite sides of MR sensor 410. Gap layers 420 and 422 function to magnetically insulate MR sensor 410 from shields 424 and 426. Gap layers 420 and 422 are formed of nonmagnetic material, and are commonly formed with a thickness in a range of about 50 Angstroms to about 200 Angstroms.

Shield 424 is formed on gap layer 420 opposite MR sensor 410 and contacts 416 and 418. Shield 426 is formed on gap layer 422 opposite MR sensor 410 and PM bias elements 412 and 414. Shields 424 and 426 are formed on opposite sides of MR sensor 410. MR sensor 410 reads only information stored directly beneath it on a specific track of the magnetic medium because shields 424 and 426 function to absorb any stray magnetic fields emanating from adjacent tracks and transitions.

The increased sensitivity of MR sensor 410 helps maintain constant sensor output over MR sensor 410 width $W_{MR}$. As the length $L_{PM}$ of PM bias elements 412 and 414 gets shorter, the demagnetization field generated within PM bias elements 412 and 414 increases, resulting in a significant reduction in the PM external field. A reduction in the PM external field results in a lower magnetic field exerted on MR sensor 410. The lower magnetic field exerted on MR sensor 410 prevents overpinning of the sensing layer. Overpinning of the sensing layer would reduce the sensitivity of MR sensor 410. Thus, transducing head 400 of the present invention achieves greater sensitivity without the prior art processing problems associated with thin PM bias elements.

Figure 5:
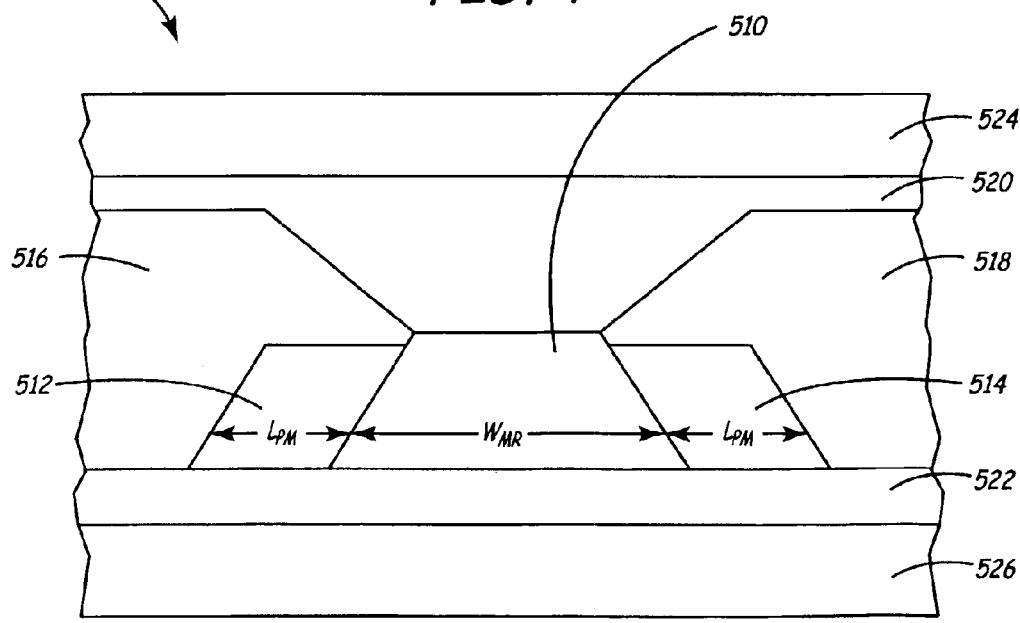
FIG. 5 is a cross-sectional view of a second embodiment of a current-in-plane transducing head in accord with the present invention.

FIG. 5 is a cross-sectional view of an alternate embodiment of a CIP transducing head 500 in accord with the present invention. For ease of identification, elements here similar to FIG. 4 are like-numbered in the last two digits, for example CIP transducing head 400 and CIP transducing head 500. Transducing head 500 comprises MR sensor 510, PM bias elements 512 and 514, contacts 516 and 518, gap layers 520 and 522, and shields 524 and 526. MR sensor 510 has a sensor width $W_{MR}$.

PM bias elements 512 and 514 abut opposite sides of MR sensor 510. PM bias elements 512 and 514 are finite in length $L_{PM}$ measured along MR sensor width $W_{MR}$. PM bias element length $L_{PM}$ is preferably about one-quarter to about five times MR sensor width $W_{MR}$.

Transducing head 510 differs from transducing head 410 in that it does not incorporate pedestals, which are not necessary to the present invention. FIG. 7A–FIG. 7H illustrate methods for producing a transducing head similar to the transducing head of FIG. 5.

Similar to MR sensor 410, the increased sensitivity of MR sensor 510 helps maintain constant sensor output over MR sensor 510 width $W_{MR}$. As the length $L_{PM}$ of PM bias elements 512 and 514 gets shorter, the demagnetization field generated within PM bias elements 512 and 514 increases, resulting in a significant reduction in the PM external field. A reduction in the PM external field results in a lower magnetic field exerted on MR sensor 510. The lower magnetic field exerted on MR sensor 510 prevents overpinning of the sensing layer. Overpinning of the sensing layer would reduce the sensitivity of MR sensor 510. Thus, an alternate embodiment of transducing head 500 of the present invention achieves greater sensitivity without the prior art processing problems associated with thin PM bias elements.

Figure 6:
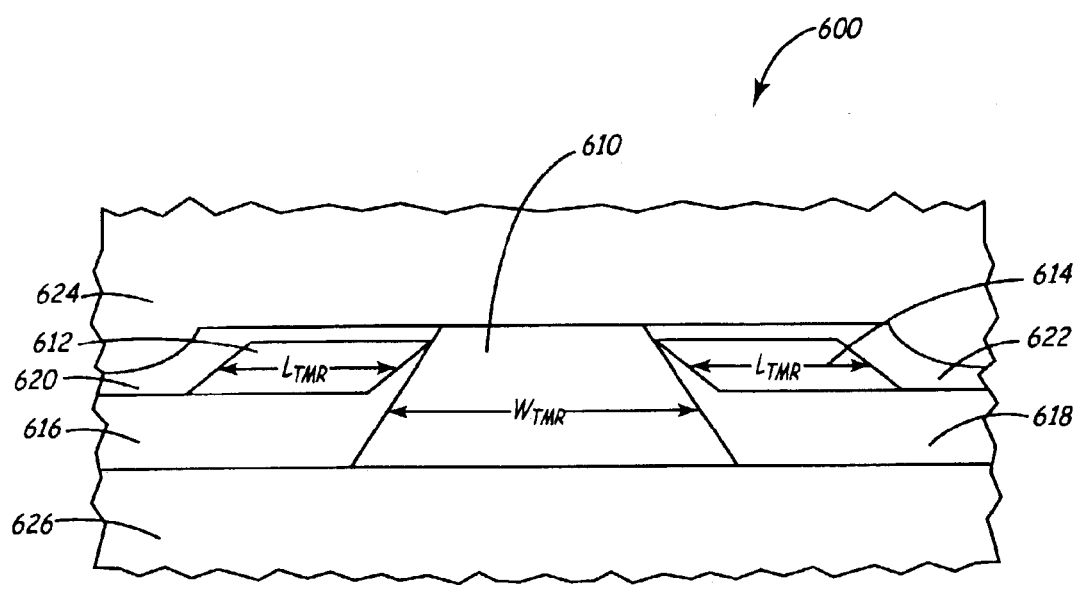
FIG. 6 is a cross-sectional view of a current-perpendicular-to-plane transducing head in accord with the present invention.

FIG. 6 is a cross-sectional view of a CPP transducing head 600 in accord with the present invention. For ease of identification, elements here similar to those in FIG. 4 are like-numbered in the last two digits, for example CIP transducing head 400 and CPP transducing head 600. Transducing head 600 comprises TGMR sensor 610, PM bias elements 612 and 614, gap layers 616, 618, 620, and 622, and shields 624 and 626. Transducing head 600 differs from transducing head 400 in that the sense current to TGMR sensor 610 is provided in a direction substantially perpendicular to the planes of layers (not shown) of TGMR sensor 610, rather than in a substantially parallel direction. TGMR sensor 610 is a multilayer device operable to sense magnetic flux from a magnetic media. At least one layer of TGMR sensor 610 is a sensing layer that requires longitudinal biasing. TGMR sensor 610 has a sensor width $W_{TMR}$.

PM bias elements 612 and 614 abut opposite sides of TGMR sensor 610. PM bias elements 612 and 614 are recessed from TGMR sensor 610 a distance in the range of about 20 Angstroms to about 300 Angstroms. PM bias elements 612 and 614 provide longitudinal biasing for the sensing layer of TGMR sensor 610. PM bias elements 612 and 614 are each generally formed of a hard magnetic material, such as, but not limited to, CoCrPt, CoCr, CoCrTa, CoCrTaPt, CoPt, or CoNiCr. PM bias elements 612 and 614 are preferably formed with a thickness in a range of about 100 Angstroms to about 1000 Angstroms. PM bias elements 612 and 614 are finite in length $L_{TMR}$ measured along the sensor width $W_{TMR}$. PM bias element length $L_{TMR}$ is preferably about one-quarter to about five times TMR sensor 610 width $W_{TMR}$.

Gap layer 616 is formed adjacent TGMR sensor 610 between PM bias element 612 and shield 626. Gap layer 618 is formed adjacent TGMR sensor 610 between PM bias element 614 and shield 626. Gap layers 616 and 618 abut opposite sides of TGMR element 610. Gap layer 620 is formed adjacent TGMR sensor 610 between PM bias element 612 and shield 624. Gap layer 622 is formed adjacent TGMR sensor 610 between PM bias element 614 and shield 624. Gap layers 620 and 622 abut opposite sides of TGMR sensor 610.

Gap layers 616, 618, 620, and 622 function to magnetically insulate TGMR sensor 610. Gap layers 616, 618, 620, and 622 also function to minimize shunting of sense current from MR sensor 610 to PM bias elements 612 and 614. Gap layers 616, 618, 620, and 622 are formed of nonmagnetic material, and are commonly formed with a thickness in a range of about 50 to about 200 Angstroms.

Shield 624 is formed adjacent TGMR sensor 610 and gap layers 620 and 622. Shield 626 is formed adjacent TGMR sensor 610 and gap layers 616 and 616. Shields 624 and 626 abut opposite sides of TGMR sensor 610. TGMR sensor 610 reads only information stored directly beneath it on a specific track of a magnetic medium because shields 624 and 626 function to absorb any stray magnetic fields emanating from adjacent tracks and transitions. In addition, shields 624 and 626 function to provide a sense current to TGMR sensor 610 in a direction substantially perpendicular to planes of layers (not shown) of TGMR sensor 610. The sense current is passed through TGMR sensor 610 to detect changes in the resistivity of TGMR sensor 610, which is indicative of the data stored on the magnetic medium being read. Shields 624 and 626 are formed of a soft magnetic material, such as, but not limited to, an NiFe alloy. Shields 624 and 626 are commonly formed with a thickness in a range of about one tenth microns to about ten microns.

Figure 7A:
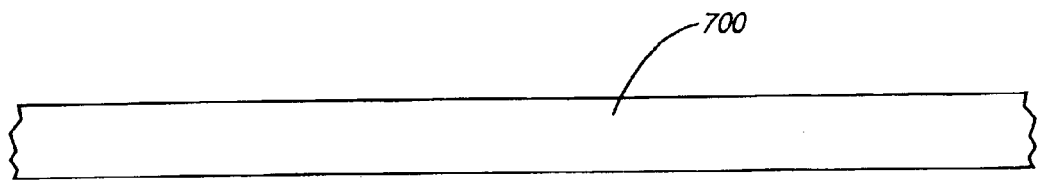
FIG. 7A–FIG. 7H illustrate a method for forming a transducing head with short permanent magnet bias elements in accord with the present invention.
Figure 7B:
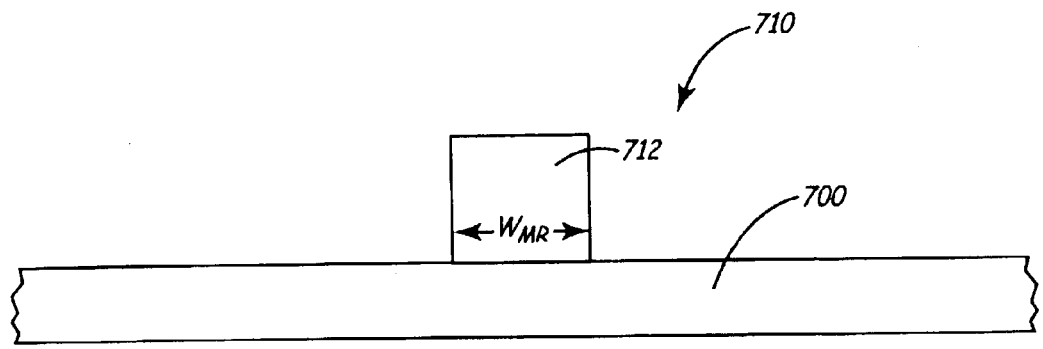
Figure 7C:
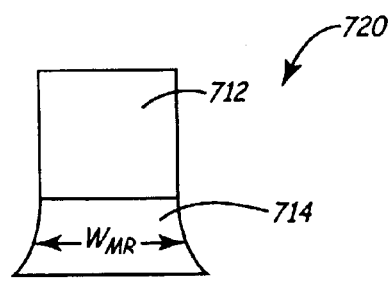
Figure 7D:
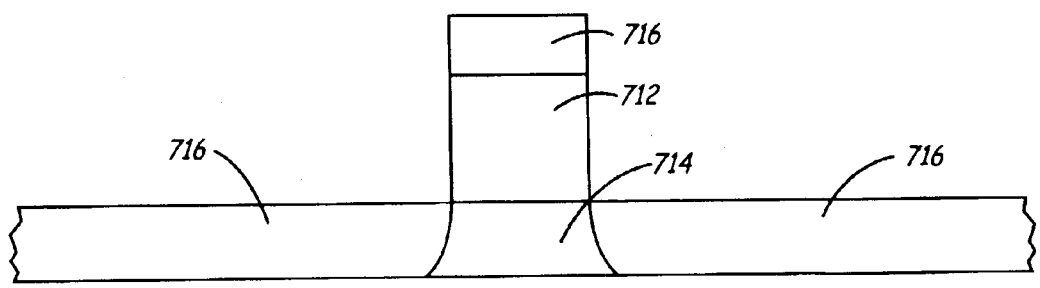

FIG. 7A–FIG. 7H illustrate a method for forming a transducing head with short PM bias elements in accord with the FIG. 5 embodiment of the present invention. FIG. 7A shows a first step, in which a plurality of MR sensor layers 700 are deposited. FIG. 7B shows a following step in which a portion of MR sensor layers 700 is masked off by photoresist 712, wherein photoresist 712 defines MR sensor width $W_{MR}$. FIG. 7C shows the next step, in which structure 710 is milled, removing portions of MR sensor layers 700 that are not masked off. The result is MR sensor 714 with a MR sensor width $W_{MR}$. In FIG. 7D, PM bias element material 716 is deposited on structure 720, specifically, adjacent MR sensor 714 and on top of photoresist 712.

Figure 7E:
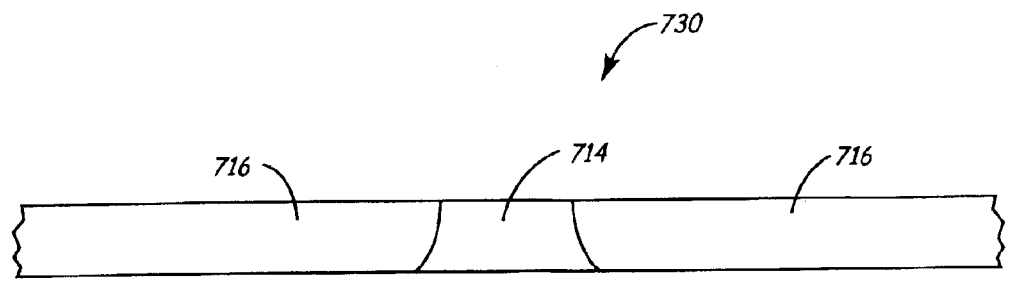
Figure 7F:
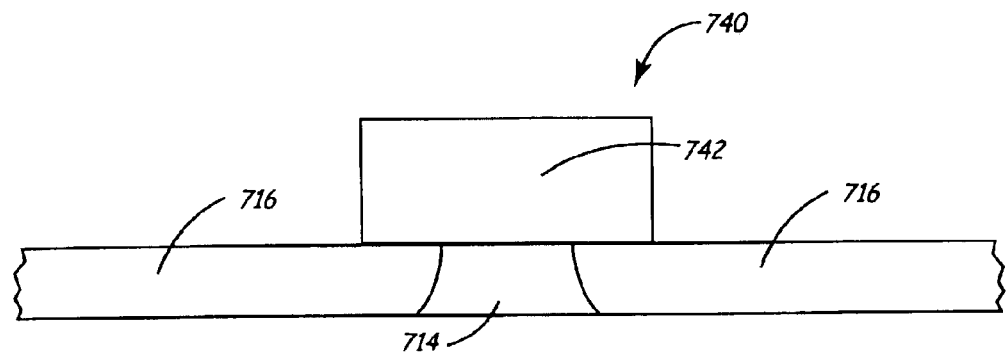
Figure 7G:
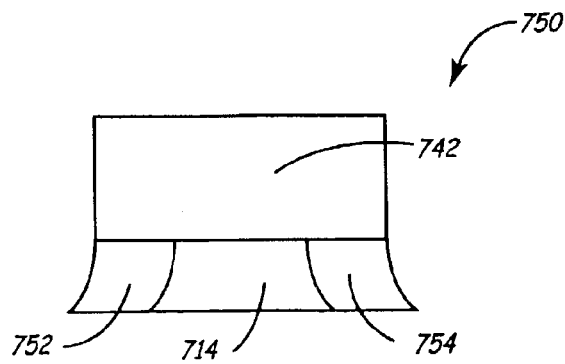
Figure 7H:
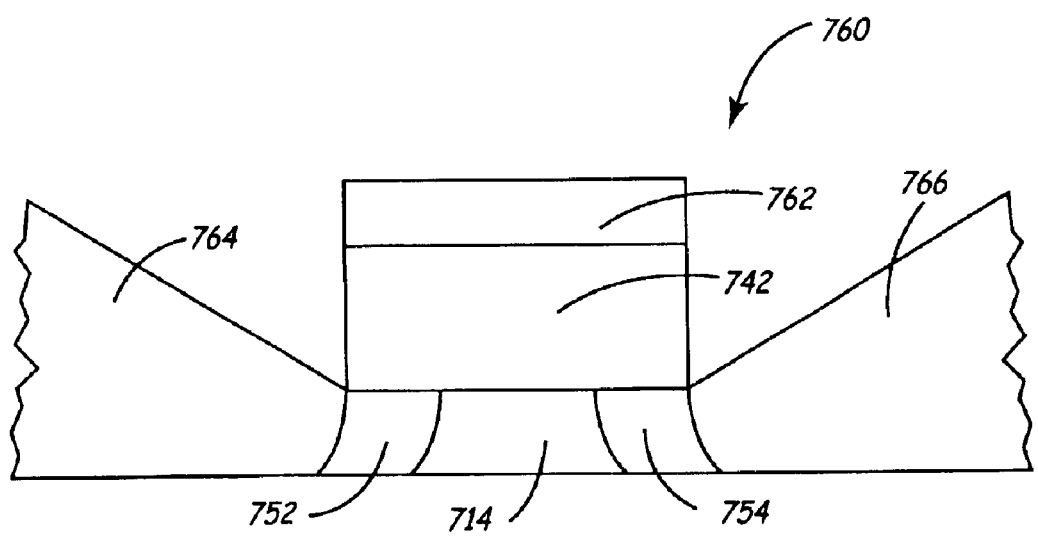

FIG. 7E shows the next step, in which photoresist 712 and excess PM bias element material 716 deposited on top of photoresist 712 are removed by known means. A second mask is then applied to structure 730. FIG. 7F shows structure 740, which results after second mask, photoresist 742, is applied. Photoresist 742 is used to mask off MR sensor 714 as well as desired parts of PM bias element material 716, adjacent MR sensor 714. FIG. 7G shows structure 740 after milling, wherein resulting structure 750 comprises photoresist 742 and short PM bias elements 752 and 754 abutting MR sensor 714. FIG. 7H shows a following step, in which a contact material is deposited to form contacts 764 and 766 adjacent PM bias elements 752 and 754, respectively. Excess contact material 762 is also formed on second mask 742. Contacts 764 and 766 are electrically connected to MR sensor 714 through respective PM bias elements 752 and 754.

In a step not shown, gap layer material is deposited on structure 760 after photoresist 742 and excess contact material 762 are removed by known methods. In a step following the depositing of gap layer material, shield material is deposited on the resulting structure.

Methods similar to the methods illustrated in FIG. 7A–FIG. 7H can be used to form transducing head 400 of FIG. 4. The methods differ only in that for the method of forming transducing head 400 of FIG. 4, a conductive pedestal material is deposited prior to depositing PM bias element material.

Methods similar to the methods illustrated in FIG. 7A–FIG. 7H can also be used to form transducing head 600 of FIG. 6. The methods differ only in that for the method of forming transducing head 600 of FIG. 6, a nonmagnetic gap layer material is deposited prior to depositing PM bias element material.

In conclusion, the present invention allows for increased sensitivity of an MR sensor by truncating the PM bias elements along the sensor width direction. Thus, the present invention allows for greater MR sensor sensitivity without requiring the thinning of the sensor's PM bias elements.

Although the present invention has been described with reference to preferred embodiments, workers skilled in the art will recognize that changes may be made in form and detail without departing from the spirit and scope of the invention.

What is claimed is:

1. A transducing head comprising:
   a magnetoresistive sensor having a sensor width;
   a first bias element having a first length, a direction of the first length being substantially similar to a direction of the sensor width; and
   a second bias element having a second length, a direction of the second length being substantially similar to a direction of the sensor width, wherein the magnetoresistive sensor is positioned between the first and second bias elements, and wherein the first and second lengths are about one-tenth to about twenty times the sensor width.

2. The transducing head of claim 1 wherein the first and second bias elements are each permanent magnets.

3. The transducing head of claim 1 wherein a thickness of the first and second bias elements is in a range of about 100 Angstroms to about 1000 Angstroms.

4. The transducing head of claim 1 wherein the first and second lengths are about one-quarter to about five times the sensor width.

5. The transducing head of claim 1 and further comprising a first and a second pedestal, wherein the first and second pedestals are formed of a conductive material and abut opposite sides of the magnetoresistive sensor, the first pedestal elevating the first bias element, and the second pedestal elevating the second bias element.

6. The transducing head of claim 1 and further comprising a first contact and a second contact, wherein the first contact is adjacent the first bias element and the second contact is adjacent the second bias element.

7. The transducing head of claim 1 wherein the magnetoresistive sensor is a current-in-plane magnetoresistive sensor.

8. The transducing head of claim 1 wherein the magnetoresistive sensor is a current-perpendicular-to-plane magnetoresistive sensor.

9. A magnetic data storage and retrieval system comprising:
   a magnetoresistive sensor having a sensor width; and
   means for longitudinally biasing the magnetoresistive sensor, the means having a length, a direction of the length being substantially similar to a direction of the sensor width, wherein the length is about one-tenth to about twenty times the sensor width.

10. The magnetic data storage and retrieval system of claim 9 wherein the magnetoresistive sensor is a current-in-plane magnetoresistive sensor.

11. The magnetic data storage and retrieval system of claim 9 wherein the magnetoresistive sensor is a current-perpendicular-to-plane magnetoresistive sensor.

12. The magnetic data storage and retrieval system of claim 9 wherein the means comprises a first bias element and a second bias element, the first and second bias elements being disposed on opposite sides of the magnetoresistive read sensor.

13. The magnetic data storage and retrieval system of claim 12 wherein the first and second bias elements are each permanent magnets.

14. The magnetic data storage and retrieval system of claim 12 wherein a thickness of the first and second bias elements is in a range of about 100 Angstroms to about 1000 Angstroms.

15. The magnetic data storage and retrieval system of claim 12 wherein the first and second bias element lengths each are about one-quarter to about five times the sensor width.

16. The magnetic data storage and retrieval system of claim 12 and further comprising a first and a second pedestal, wherein the first and second pedestals are formed of a conductive material and abut opposite sides of the magnetoresistive sensor, the first pedestal elevating the first bias element, and the second pedestal elevating the second bias element.

17. The magnetic data storage and retrieval system of claim 12 and further comprising a first contact and a second contact, wherein the first contact is adjacent the first bias element and the second contact is adjacent the second bias element.

* * * * *